(12) United States Patent
Newman et al.

(10) Patent No.: US 11,497,295 B1
(45) Date of Patent: Nov. 15, 2022

(54) HANDS-FREE FOOD CARRIER

(71) Applicants: Gabriel Paul Newman, Long Beach, NY (US); Brittany Rose Falussy, Long Beach, NY (US)

(72) Inventors: Gabriel Paul Newman, Long Beach, NY (US); Brittany Rose Falussy, Long Beach, NY (US)

(*) Notice: Subject to any disclaimer, the term of this patent is extended or adjusted under 35 U.S.C. 154(b) by 0 days.

(21) Appl. No.: 16/922,104

(22) Filed: Jul. 7, 2020

Related U.S. Application Data

(60) Provisional application No. 62/871,761, filed on Jul. 9, 2019.

(51) Int. Cl.
| | |
|---|---|
| *A45F 3/14* | (2006.01) |
| *A45F 5/00* | (2006.01) |
| *A47J 47/14* | (2006.01) |
| *A45C 13/10* | (2006.01) |
| *A45C 3/00* | (2006.01) |
| *A45F 3/00* | (2006.01) |

(52) U.S. Cl.
CPC ............ *A45F 3/14* (2013.01); *A45C 3/001* (2013.01); *A45C 13/10* (2013.01); *A45F 5/00* (2013.01); *A47J 47/14* (2013.01); *A45F 2003/002* (2013.01); *A45F 2003/142* (2013.01)

(58) Field of Classification Search
CPC ...... A45F 3/14; A45F 5/00; A45F 5/02; A45F 3/02; A45F 2003/002; A47G 2023/0675; A47J 47/14; A45C 11/20
USPC ........ 224/646–647, 257–258, 260, 603–605, 224/607, 610–612, 614, 615–617, 619, 224/621, 623, 582–583; 294/143, 145, 294/146, 159–163, 165
See application file for complete search history.

(56) References Cited

U.S. PATENT DOCUMENTS

| | | | |
|---|---|---|---|
| 2,643,803 A * | 6/1953 | Bates | A45F 5/00 119/857 |
| 3,094,264 A | 6/1963 | Petrone et al. | |
| 4,125,211 A * | 11/1978 | Handsman | A45F 5/00 224/259 |
| D252,938 S | 9/1979 | Binderup | |
| 4,487,346 A * | 12/1984 | Fischer, Jr. | A47D 13/025 224/259 |
| 4,732,274 A | 3/1988 | Bouton | |
| 4,811,846 A | 3/1989 | Bottega | |
| 5,875,490 A | 3/1999 | Woodard et al. | |
| 6,109,580 A | 8/2000 | Stern et al. | |
| 6,866,173 B2 * | 3/2005 | Haber | A45F 3/04 224/160 |
| 7,686,196 B2 * | 3/2010 | Panosian | F41C 33/041 224/904 |

(Continued)

*Primary Examiner* — Adam J Waggenspack
(74) *Attorney, Agent, or Firm* — Thomas M. Joseph, Esq

(57) ABSTRACT

An elongated flexible member has a center portion and a pair of end portions with each end portion having a plurality of openings therein. A module has an elongated tubular body defining a chamber therein and has a pair of tabs extending in opposite directions therefrom. A pair of fasteners with each fastener having a male connector positioned on one side and a female connector having open slot on the opposite side is provided. Each of the module tabs insert into one of fastener female connector open slots. Each of the fastener male connector insert into one of the elongated flexible member end portion openings to connect the module to the elongated flexible member.

13 Claims, 5 Drawing Sheets

(56) References Cited

U.S. PATENT DOCUMENTS

| | | | |
|---|---|---|---|
| 8,157,137 B1* | 4/2012 | Laird | A45F 3/14 |
| | | | 108/43 |
| D744,859 S | 12/2015 | Walker et al. | |
| D776,434 S | 1/2017 | Kelso et al. | |
| 2005/0035009 A1 | 2/2005 | Cuomo | |
| 2009/0021058 A1 | 1/2009 | Rajack et al. | |
| 2009/0078730 A1* | 3/2009 | Kuny | A45F 5/021 |
| | | | 224/269 |
| 2012/0305616 A1* | 12/2012 | Smith | F41B 5/1461 |
| | | | 224/614 |

* cited by examiner

300

```
┌─────────────────────────────────────────────────┐
│ PROVIDE AN ELONGATED FLEXIBLE MEMBER HAVING A   │
│ CENTER PORTION AND A PAIR OF END PORTIONS WITH  │
│ EACH END PORTION HAVING A PLURAL OF OPENINGS    │
│ THEREIN, A PAIR OF FASTENERS WITH EACH FASTENER │──301
│ HAVING A FIRST MEMBER DEFINING A MALE CONNECTOR │
│ EXTENDING FROM ONE SIDE AND A SECOND MEMBER     │
│ DEFINING A FEMALE CONNECTOR ON THE OPPOSITE     │
│ SIDE, AND A MODULE WITH A PAIR OF TABS EXTENDING│
│ FROM OPPOSITE SIDES OF THE MODULE               │
└─────────────────────────────────────────────────┘
                          ↓
┌─────────────────────────────────────────────────┐
│ INSERT ONE OF THE MODULE TABS INTO ONE OF THE   │──302
│ PAIR OF FASTENER FEMALE CONNECTORS              │
└─────────────────────────────────────────────────┘
                          ↓
┌─────────────────────────────────────────────────┐
│ INSERT THE OTHER ONE OF THE MODULE TABS INTO    │
│ THE OTHER ONE OF THE PAIR OF FASTENER FEMALE    │──303
│ CONNECTORS                                      │
└─────────────────────────────────────────────────┘
                          ↓
┌─────────────────────────────────────────────────┐
│ INSERT A MALE CONNECTOR FROM ONE OF THE PAIR OF │
│ FASTENERS INTO ONE OF THE ELONGATED FLEXIBLE    │──304
│ MEMBER END PORTION OPENINGS                     │
└─────────────────────────────────────────────────┘
                          ↓
┌─────────────────────────────────────────────────┐
│ INSERT THE OTHER MALE CONNECTOR FROM THE        │
│ OTHER ONE OF THE PAIR OF FASTENERS INTO THE     │
│ OTHER ONE OF THE ELONGATED FLEXIBLE MEMBER END  │──305
│ PORTION OPENINGS TO CONNECT THE ELONGATED       │
│ FLEXIBLE MEMBER TO THE MODULE                   │
└─────────────────────────────────────────────────┘
```

FIG. 12

HANDS-FREE FOOD CARRIER

CROSS REFERENCE TO RELATED APPLICATION

This application claims the benefit under 35 U.S.C. § 119(e) of U.S. Provisional Application No. 62/871,761 entitled "HANDS-FREE FOOD CARRIER" filed Jul. 9, 2019, which is incorporated herein by reference.

BACKGROUND

Storage containers and trays for storing and transporting concessions are commonly provided to patrons at sporting events, ballgames, and other entertainment events, such as concerts, festivals, and cookouts. These concessions can include popcorn, candy, hot dogs and carbonated beverages which patrons purchase from concession stands and consume in the comfort of their respective chairs at the entertainment or sporting event. In many instances, providing patrons with a convenient means for storing and enjoying concessions at their respective chairs adds to their overall enjoyment of the entertainment or sporting events.

Given that concession sales represent a sizeable source of revenue for entertainment and sport event operators, many operators have sought convenient means for enabling patrons to transport and enjoy purchased concessions at their chairs during such events. As a result, commercial vendors have developed numerous trays, caddies, boxes, and bags that are designed to be carried by hand. Such objects include commercially available pre-formed, rigid containers that are adapted for repetitive uses by patrons over an extended period of time. Unfortunately, these existing trays are currently limited by the constraints of the human body in carrying objects (i.e., most humans have two hands to carry objects).

People have a limited ability to carry concession trays and containers and carrying such trays and containers can limit the use of their hands. Most existing container must be carried by hand. Such constraints limit concession sales due to a given person's maximum capacity of beverage and food transportation and consumption. Consequently, a need exists for an improved food packaging system that provide vendors with the ability to engage in fast-paced transactions and maintain high levels of customer satisfaction.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a food transportation apparatus including an elongated flexible member having a center portion and a pair of end portions with each end portion having a plurality of openings therein. A module has an elongated tubular body defining a chamber therein and having a pair of tabs extending in opposite directions therefrom. A pair of fasteners with each fastener having a male connector positioned on one side and a female connector having open slot on the opposite side is provided. Each of the module tabs insert into one of fastener female connector open slots. Each of the fastener male connector insert into one of the elongated flexible member end portion openings to connect the module to the elongated flexible member.

In other implementations, a method for assembling a food carrier includes providing an elongated flexible member having a center portion and a pair of end portions with each end portion having a plural of openings therein, a pair of fasteners with each fastener having a first member defining a male connector extending from one side and a second member defining a female connector on the opposite side, and a module with a pair of tabs extending from opposite sides of the module. One of the elongated reclosable module tabs is inserted into one of the pair of fastener female connectors. The other one of the elongated reclosable module tabs is inserted into the other one of the pair of fastener female connectors. A male connector from one of the pair of fasteners is inserted into one of the elongated flexible member end portion openings. The other male connector from the other one of the pair of fasteners is inserted into the other one of the elongated flexible member end portion openings to connect the elongated flexible member to the elongated reclosable modules.

In yet other implementations, a kit includes an elongated flexible member having a center portion and a pair of end portions with each end portion having a plurality of openings therein. A module has a pair of opposing side walls with each side wall having a tab extending therefrom. A plurality of fasteners with each fastener having a male connector on one side and a female connector on the opposing side is provided. The module side wall tabs insert into the fastener female connectors and the fastener female connectors insert into the elongated flexible member end portion openings to assemble a food carrying harness.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 12 is an exemplary process in accordance with the subject disclosure.

DETAILED DESCRIPTION

Figure 1:
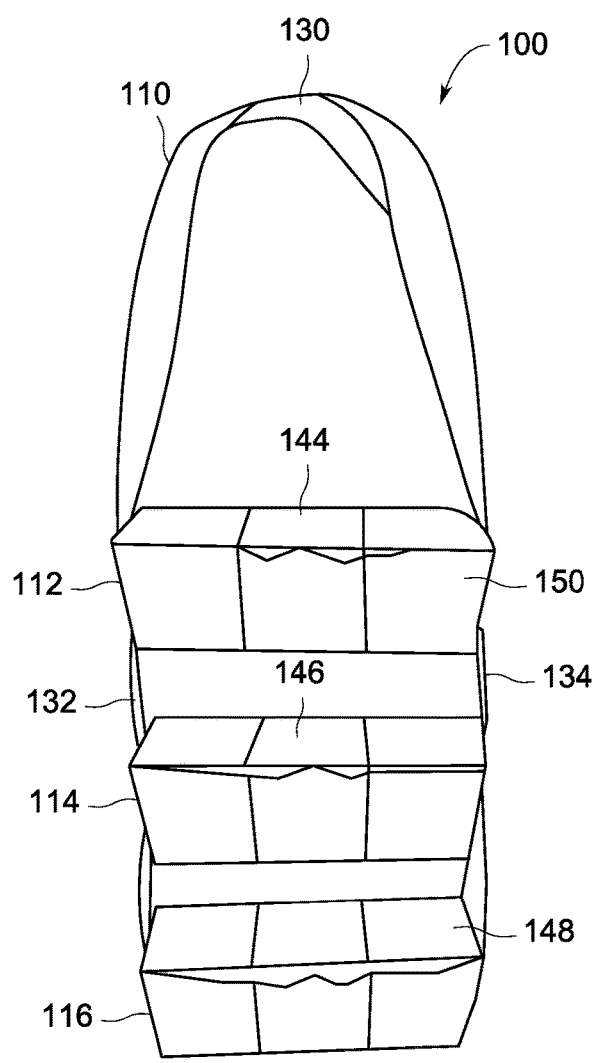
FIG. 1 is a perspective view of a hands-free food carrier in accordance with the subject matter of this disclosure.
Figure 2:
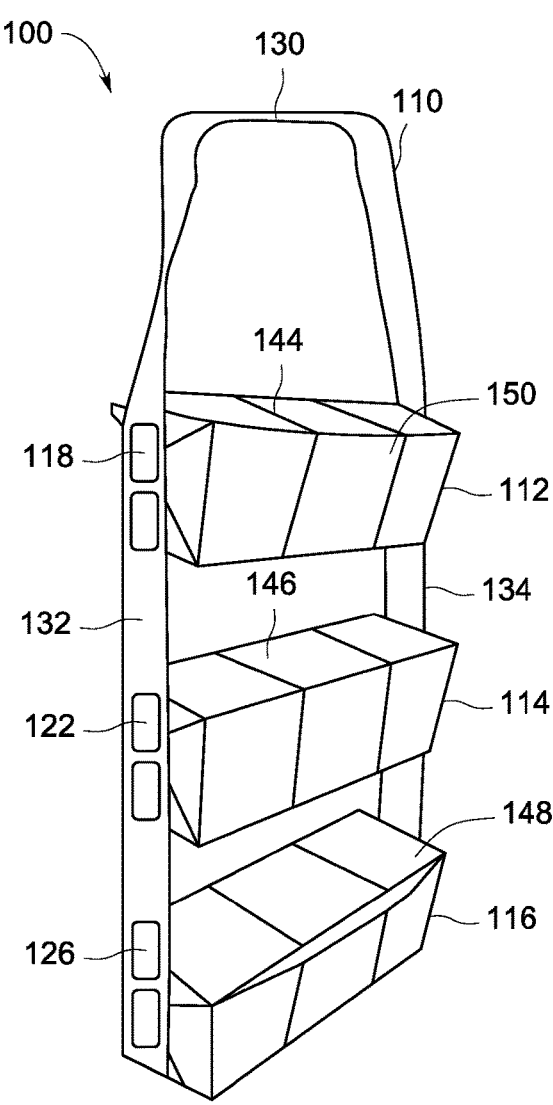
FIG. 2 is another perspective view of the hands-free food carrier shown in FIG. 1 in accordance with the subject matter of this disclosure.
Figure 3:
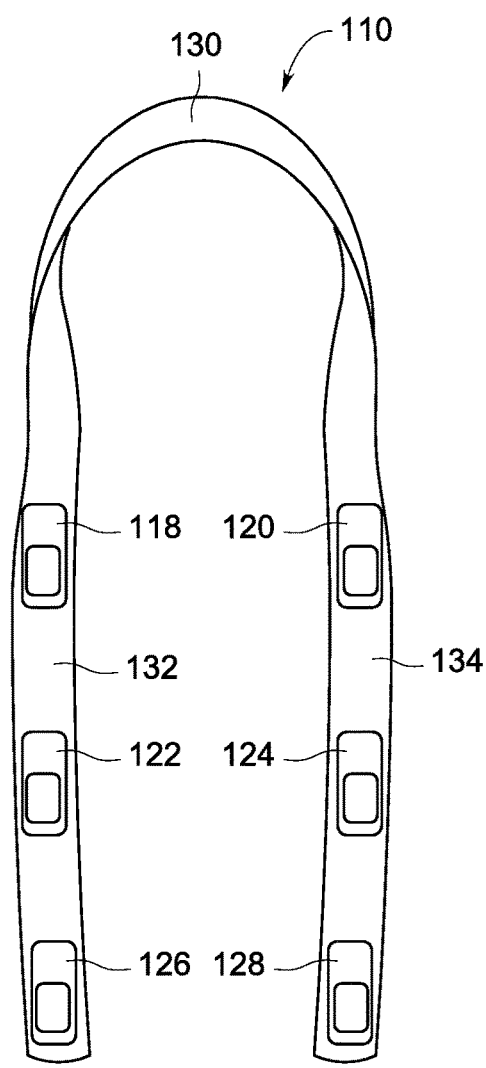
FIG. 3 is a perspective view of a flexible member with a plurality of fasteners in accordance with the subject matter of this disclosure.

The subject disclosure is directed to a hands-free food carrier and, more particularly, to a food transportation apparatus that transforms a flexible member into a rigid harness that can support multiple filled food cartons. The flexible member includes a center portion that can be bent into a half-circle configuration and a pair of end portions that can be aligned in a spaced-apart parallel relation. Fasteners can connect the cartons to the end portions to form the harness.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring now to FIGS. 1-6, there is shown a food transportation apparatus, food transport, or food carrier, generally designated by the numeral 100, that is particularly adapted for transporting and/or carrying food, beverages, and other related items at sporting events and/or entertainment events. The food transportation apparatus 100 can include an elongated flexible member 110, a plurality of modules 112-116, and a plurality of fasteners 118-128 that can be assembled into a harness that can be worn by user to transport items at an event.

The elongated flexible member 110 can have a center portion 130 and a pair of end portions 132-134. The end portions 132-134 include a plurality of openings. The openings can be formed through any suitable process. In this exemplary embodiment, the openings are formed by making perforated incisions in the end portions 132-134. The incisions are aligned with one another to ensure that the modules 112-116 are level when attached to the elongated flexible member 110.

The elongated flexible member 110 can be bent into a hands-free harness configuration with the pair of end portions 132-134 aligned in a parallel, spaced apart relationship. In that configuration, the center portion 130 defines a collar to be worn around the neck of a user (not shown) to support the food transportation apparatus 100. This provides the user with the ability to carry more food, beverages, or other items because, generally, a human torso/back can support more weight than a pair of arms can carry.

The modules 112-116 can be stacked and aligned essentially parallel to one another in an overlying relationship with sufficient space therebetween to allow the modules 112-116 to be opened and/or closed to facilitate insertion and removal of items therein. The modules 112-116 can be essentially identical to one another or can have different shapes or configurations. In this exemplary embodiment, the modules 112-116 are essentially identical to one another.

Each one of the modules 112-116 includes an elongated tubular body 136 that defines a chamber 138 therein and a pair of tabs 140-142. The tabs 140-142 extend in opposite directions from the elongated tubular body 136.

The modules 112-116 form recloseable receptacles for storing food, beverages, and other items that are carried on the food transportation apparatus 100. The modules 112-116 can have pivotally attached, recloseable lids 144-148 that provide access to the items. In this exemplary embodiment, the recloseable lids 144-148 upper surfaces are essentially flat. In other embodiments, the recloseable lids 144-148 upper surfaces can form integral trays or receptacles to facilitate the carrying of additional food, beverages, or other items.

The plurality of fasteners 118-128 can attach the modules 112-116 to the elongated flexible member end portions 132-134. The fasteners 118-128 can frictionally engage the modules 112-116 and the elongated flexible member end portions 132-134 to impart rigidity to the food transportation apparatus 100 when it forms a harness. The fasteners 118-128 can be identical to one another in construction, shape, and/or configuration. In this exemplary embodiment, the fasteners 118-128 are essentially identical to one another to ensure that the weight of the modules 112-116 is evenly distributed when attached to the elongated flexible member 110.

Figure 4:
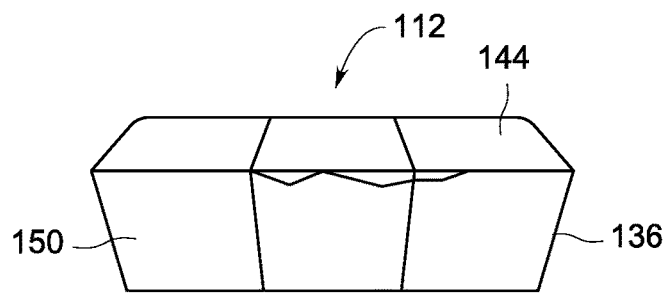
FIG. 4 is a perspective view of an elongated recloseable carton in accordance with the subject matter of this disclosure.
Figure 5:
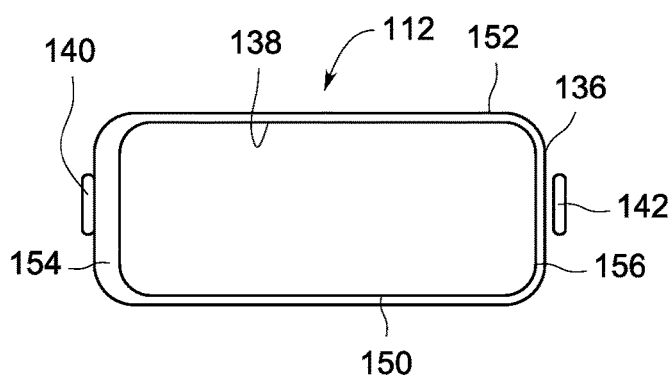
FIG. 5 is a top view in cross section of the elongated recloseable carton shown in FIG. 4 in accordance with the subject matter of this disclosure.
Figure 6:
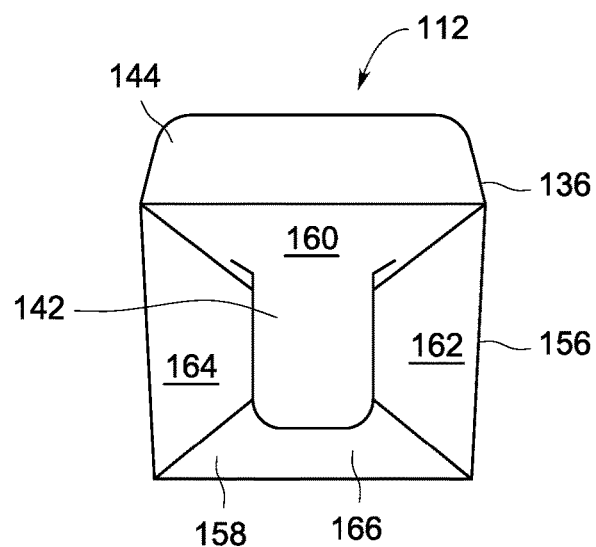
FIG. 6 is a side perspective view of the elongated recloseable carton shown in FIG. 4 in accordance with the subject matter of this disclosure.

As shown in FIGS. 4-6, the elongated tubular body 136 is essentially rectilinear. The body 136 includes a front wall 150, a rear wall 152, a pair of side walls 154-156, a bottom 158, and one of the pivotally attached lids 144-148. Each one of the side walls 154-156 can be formed from a plurality of folds 160-166.

The tabs 140-142 extend in opposite directions from the side walls 154-156. In some embodiments, the bottom 158 can include impressions or indentations (not shown) that are configured to receive cups, bottles, or other vessels for storing liquids. In other embodiments, the body 136 can include dividing walls or ribs (not shown) to define multiple compartments therein. Additionally, the body 136 can be divided into segments or sections that are joined to one another or are integral with one another.

Referring back to FIGS. 1-6, the elongated flexible member 110 can be made from any suitable material through any suitable manufacturing method. Suitable materials include flexible materials or materials that exhibit flexible characteristics and rigid characteristics, namely that exhibit flexibility under certain conditions, such as elevated temperatures, and that can become rigid under other conditions, such as lower temperatures. In some embodiments, the elongated flexible member 110 can be manufactured from recyclable or recycled materials.

Suitable materials for the elongated flexible member 110 can include metals, plastics, and/or composites. Specifically, suitable materials can include nylon webbing. In some embodiments, the elongated flexible member 110 can be made from a preselected material that has sufficient tensile strength to support the plurality of modules 112-116 when the plurality of modules 112-116 are fully loaded with food, beverages, and/or other similar items.

The dimensions of the elongated flexible member 110 are not critical. In some embodiments, the length of the elongated flexible member 110 can be about 50 inches when fully extended. In other embodiments, the elongated flexible member 110 can have a preselected, customized length based on the height of the individual wearing the device.

The modules 112-116 can be made from any suitable material through any suitable manufacturing method. Suitable materials include flexible, rigid, or semi-rigid materials. Suitable materials also include metals, ceramics, plastics, and composites. Specifically, suitable materials can include cardboard (solid or corrugated), wax coated or plastic-coated paperboard, or other lightweight materials. In some embodiments, the modules 112-116 can be an elongated oyster pail. In some embodiments, the modules 112-116 can be manufactured from recyclable or recycled materials.

The fasteners 118-128 can be made from any suitable material through any suitable manufacturing method. Suitable materials include flexible, rigid, or semi-rigid materials. Suitable materials also include metals, ceramics, plastics, and composites. In some embodiments, the suitable materials can include plastic materials, such as thermosets, thermoplastics, thermoplastic elastomers, elastomers, rubbers, network polymer materials, and plastic composite materials. In some embodiments, the fasteners 118-128 can be manufactured from recyclable or recycled materials.

Figure 7:
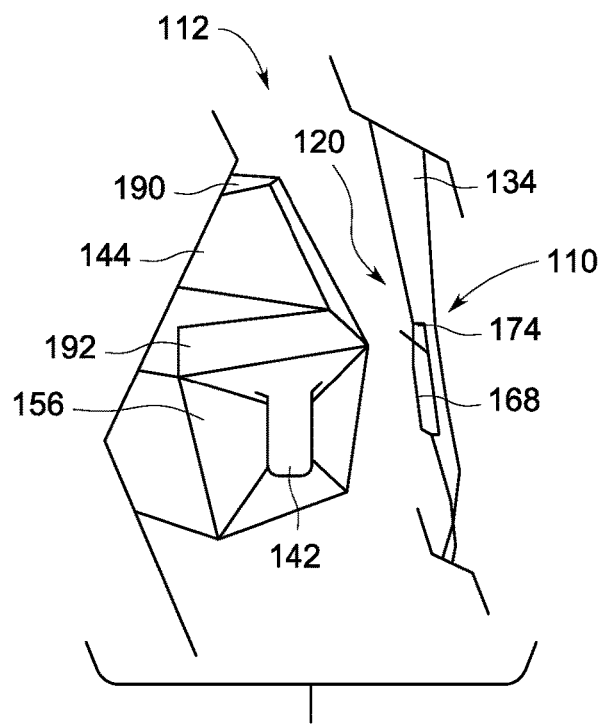
FIG. 7 is a fragmentary perspective view of a portion of a pre-assembled hands-free food carrier in accordance with the subject matter of this disclosure.
Figure 8:
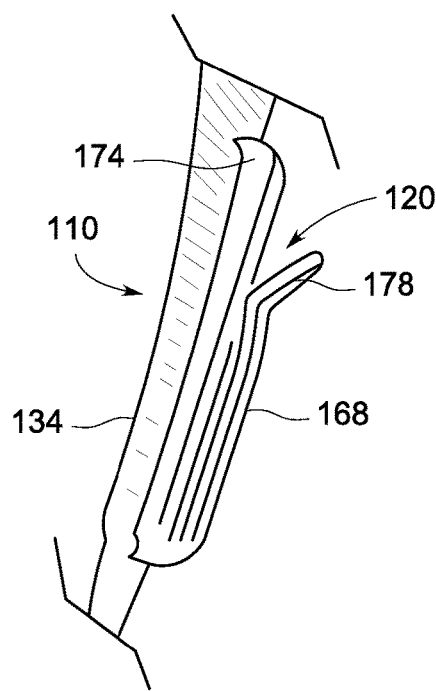
FIG. 8 is a fragmentary perspective view of a fastener that has been inserted into an opening in an end portion of flexible member in accordance with the subject matter of this disclosure.
Figure 9:
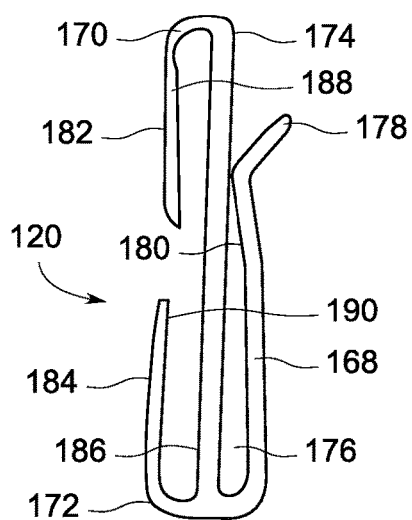
FIG. 9 is a top plan view of a fastener in accordance with the subject matter of this disclosure.

Referring now to FIGS. 7-9 with continuing reference to the foregoing figures, the connection of the module 112 with the end portion 134 of the flexible member 110 is shown in more detail. The module 112 connects to the end portion 134 with the fastener 120 to impart rigidity to the food transport apparatus 100 and to facilitate the carrying of food, beverages, and/or other similar items.

The fastener 120 includes a plurality of L-shaped members 168-172 that project outwardly from an essentially planar portion 174. The L-shaped members 170-172 project outwardly from the essentially planar portion 174 in an opposite direction from the L-shaped member 168. In this exemplary embodiment, the L-shaped members 168-172 are made from molded plastic bends.

The L-shaped member 168 defines a female connector that includes a partially open slot 176. The slot 176 can receive the tab 142 to connect the module 112 to the fastener 120. In some embodiments, the L-shaped member 168 can include an angular projection or tongue 178 that facilitates the sliding of the tab 142 into the slot 176. Once the tab 142 is inserted into the slot 176, an inner surface 180 of the L-shaped member 168 can frictionally engage the tab 142 to provide a rigid and stable connection between the fastener 120 and the module 112.

The L-shaped members 170-172 define male connectors that include opposing arms 182-184 that project vertically in a direction that is essentially parallel to a planar surface 186 on the essentially planar portion 174. The arms 182-184 can be inserted into openings in the end portion 134 to connect the flexible member 110 to the module 112. The opposing arms 182-184 include inner surfaces 188-190 that can engage the end portion 134 frictionally to stabilize the connection of the flexible member 110 to the module 112.

As shown in FIG. 7, the module 112 includes a pivotally connected lid 144 and a side wall 156. The lid 144 can include a flange 190. The side wall 156 can include a flap 192. The flange 190 and the flap 192 can provide the lid 144 with the ability to close in a more secure manner.

Figure 10:
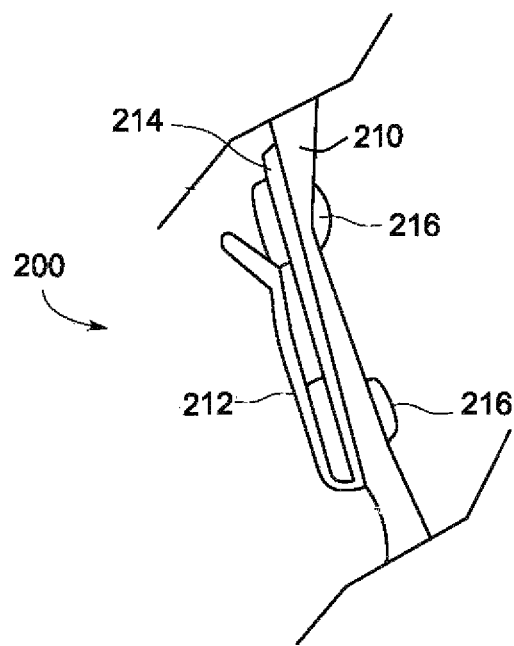
FIG. 10 is a fragmentary perspective view of another embodiment of a fastener that has been inserted into an opening in an end portion of flexible member in accordance with the subject matter of this disclosure.
Figure 11:
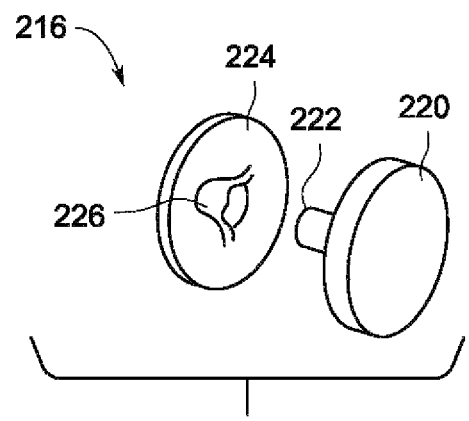
FIG. 11 is a perspective view of a pop rivet in accordance with the subject matter of this disclosure.

Referring now to FIGS. 10-11 with continuing reference to the foregoing figures, there is shown another embodiment of a fastener, generally designated by the numeral 200, that has been inserted into an opening in an elongated flexible member end portion 210. The end portion 210 is essentially equivalent to the elongated flexible member end portion 132 shown in FIGS. 1-3 or the elongated flexible member end portion 134 shown in FIGS. 1-3 and 7-8.

Like the fasteners 118-120 shown in FIGS. 2-3 and 7-9, the fastener 200 includes an L-shaped member 212 that can form a female connector and an essentially planar portion 214 that are essentially equivalent to the L-shaped member 168 and the essentially planar portion 174 shown in FIG. 9.

Unlike the fasteners 118-120 shown in FIGS. 2-3 and 7-9, the fastener 200 includes a pair of blind rivets 216-218. As shown in FIG. 11, the blind rivet 216 includes a rivet body 220 with a mandrel 222 projecting therefrom and top 224 with a hole 226 for receiving the mandrel 222. The mandrel 222 inserts into an opening in the end portion 210 before inserting into the hole 226, which joins the fastener 200 to the end portion 210.

Referring now to FIG. 12 with continuing reference to the foregoing figures, an exemplary method, generally designated with the numeral 300, for assembling a food transportation apparatus, food transport, or food carrier. The method 300 can be performed to assemble the food transportation apparatus 100 shown in FIGS. 1-2.

At 301, an elongated flexible member having a center portion and a pair of end portions with each end portion having a plural of openings therein, a pair of fasteners with each fastener having a first member defining a male connector extending from one side and a second member defining a female connector on the opposite side, and a module with a pair of tabs extending from opposite sides of the module are provided. In this exemplary embodiment, the elongated flexible member can be the elongated flexible member 110 shown in FIGS. 1-3 and 7-8, the pair of fasteners can be the fasteners 118-120 shown in FIGS. 2-3 and 7-9, and the module can be the module 112 shown in FIGS. 1-2 and 4-7.

At 302, one of the module tabs is inserted into one of the pair of fastener female connectors. In this exemplary embodiment, the module tab can be the module tab 140 shown in FIG. 5. The fastener female connector can be the fastener female connector extending from the fastener 118 shown in FIGS. 2-3.

At 303, the other one of the module tabs is inserted into the other one of the pair of fastener female connectors. In this exemplary embodiment, the module tab can be the module tab 142 shown in FIGS. 5-7. The fastener female connector can be the fastener female connector extending from the fastener 120 shown in FIGS. 3 and 7-9.

At 304, a male connector from one of the pair of fasteners is inserted into one of the elongated flexible member end portion openings. In this exemplary embodiment, the elongated flexible member end portion can be the elongated flexible member end portion 132 shown in FIGS. 1-3. The fastener male connector can be at least one of the fastener male connectors extending from the fastener 118 shown in FIGS. 2-3.

At 305, the other male connector from the other one of the pair of fasteners is inserted into the other one of the elongated flexible member end portion openings to connect the elongated flexible member to the module. In this exemplary embodiment, the elongated flexible member end portion can be the elongated flexible member end portion 134 shown in FIGS. 1-3 and 7-8. The fastener male connector can be at least one of the fastener male connectors extending from the fastener 120 shown in FIGS. 3 and 7-9.

Supported Features And Embodiments

The detailed description provided above in connection with the appended drawings explicitly describes and supports various features of a hands-free food carrier. By way of illustration and not limitation, supported embodiments include a food transportation apparatus comprising: an elongated flexible member having a center portion and a pair of end portions with each end portion having a plurality of openings therein, a module having an elongated tubular body defining a chamber therein and having a pair of tabs extending in opposite directions therefrom, and a pair of fasteners with each fastener having a male connector positioned on one side and a female connector having open slot on the opposite side, wherein each of the module tabs insert into one of fastener female connector open slots, and wherein each of the fastener male connector insert into one of the elongated flexible member end portion openings to connect the module to the elongated flexible member.

Supported embodiments include the foregoing food transportation apparatus, wherein the module is a recloseable module having a body with a plurality of walls, a bottom, and a lid with the plurality of walls including a front wall, a rear wall, and a pair of side walls, the bottom attaching to the front wall, the rear wall, and the pair of side walls, and the lid pivotally attaching to at least one of the front wall, the rear wall, and the pair of side walls, and each of the pair of side walls having a tab extending therefrom.

Supported embodiments include any of the foregoing food transportation apparatuses, wherein each fastener male connector and each fastener female connector includes an L-shaped member.

Supported embodiments include any of the foregoing food transportation apparatuses, wherein each fastener male connector frictionally engages one of module side wall tabs to impart rigidity to the food transportation apparatus when the module is connected to the elongated flexible member.

Supported embodiments include any of the foregoing food transportation apparatuses, further comprising a plurality of modules and a plurality of fasteners to connect the plurality of modules to the elongated flexible member.

Supported embodiments include any of the foregoing food transportation apparatuses, wherein each of the plurality of modules is identical and each of the plurality of fasteners is identical.

Supported embodiments include any of the foregoing food transportation apparatuses, wherein the elongated flexible member can be bent into a hands-free harness configuration with the pair of end portions aligned in a parallel, spaced apart relationship and the center portion defining a collar to be worn around the neck of a user to facilitate the carrying of the food transportation apparatus.

Supported embodiments include any of the foregoing food transportation apparatuses, wherein the elongated flexible member is made from a preselected material that has sufficient tensile strength to support the plurality of modules when the plurality of modules are fully loaded.

Supported embodiments include any of the foregoing food transportation apparatuses, wherein each of the plurality of lids include a flange.

Supported embodiments include any of the foregoing food transportation apparatuses, wherein the elongated flexible member is a strap.

Supported embodiments include any of the foregoing food transportation apparatuses, wherein the strap is plastic.

Supported embodiments include any of the foregoing food transportation apparatuses, wherein the module is a carton.

Supported embodiments include any of the foregoing food transportation apparatuses, wherein the module is made from paperboard. Supported embodiments include any of the foregoing food transportation apparatuses, wherein each fastener male connector includes a blind rivet and each fastener female connector includes an L-shaped member.

Supported embodiments include a kit, a method, an apparatus, and/or means for implementing any of the foregoing food transportation apparatus or a portion thereof.

Supported embodiments include a method for assembling a food carrier, the method comprising: providing an elongated flexible member having a center portion and a pair of end portions with each end portion having a plural of openings therein, a pair of fasteners with each fastener having a first member defining a male connector extending from one side and a second member defining a female connector on the opposite side, and a module with a pair of tabs extending from opposite sides of the module, inserting one of the module tabs into one of the pair of fastener female connectors, inserting the other one of the module tabs into the other one of the pair of fastener female connectors, inserting a male connector from one of the pair of fasteners into one of the elongated flexible member end portion openings, and inserting the other male connector from the other one of the pair of fasteners into the other one of the elongated flexible member end portion openings to connect the elongated flexible member to the module.

Supported embodiments include the foregoing method, further comprising: connecting additional modules to the elongated flexible member.

Supported embodiments include any of the foregoing methods, further comprising: bending the flexible member center portion into an essentially planar, semi-circle to define a collar.

Supported embodiments include any of the foregoing methods, further comprising: aligning the elongated flexible member end portions parallel to one another in a spaced apart, relationship.

Supported embodiments include a system, a kit, an apparatus, and/or means for implementing any of the foregoing methods or a portion thereof.

Supported embodiments include a kit comprising: an elongated flexible member having a center portion and a pair of end portions with each end portion having a plurality of openings therein, a module having a pair of opposing side walls with each side wall having a tab extending therefrom, and a plurality of fasteners with each fastener having a male connector on one side and a female connector on the opposing side, wherein the module side wall tabs insert into the fastener female connectors and the fastener female connectors insert into the elongated flexible member end portion openings to assemble a food carrying harness.

Supported embodiments include the foregoing kit, wherein each fastener male connector and each fastener female connector includes an L-shaped member.

Supported embodiments include any of the foregoing kits, further comprising a plurality of modules and a plurality of fasteners to connect the plurality of modules to the elongated flexible member.

Supported embodiments include any of the foregoing kits, wherein each of the plurality of modules is identical and each of the plurality of fasteners is identical.

Supported embodiments include any of the foregoing kits, wherein the elongated flexible member is made from a preselected material that has sufficient tensile strength to support the plurality of modules when the plurality of modules are fully loaded with food.

Supported embodiments include any of the foregoing kits, wherein each of the recloseable modules includes a pivotally attached lid.

Supported embodiments include any of the foregoing kits, wherein each of the plurality of recloseable module lids include a flange.

Supported embodiments include any of the foregoing kits, wherein the elongated flexible member is a strap.

Supported embodiments include any of the foregoing kits, wherein the strap is plastic.

Supported embodiments include any of the foregoing kits, wherein the module is a carton.

Supported embodiments include any of the foregoing kits, wherein the module is made from paperboard.

Supported embodiments include any of the foregoing kits, wherein each fastener male connector includes a blind rivet and each fastener female connector includes an L-shaped member.

Supported embodiments include an apparatus, a method, a system, and/or means for implementing any of the foregoing kits or a portion thereof Supported embodiments can provide various attendant and/or technical advantages in terms of an easily assembled food carrying harness that can support more weight than conventional carrying devices.

Supported embodiments include a lightweight, hands-free food transportation apparatus.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A food transportation apparatus comprising:
an elongated flexible member having a center portion and a pair of end portions with each end portion having a plurality of openings therein,
a module having an elongated body having at least one receptacle and having a pair of tabs extending in opposite directions therefrom, and
a pair of fasteners with each fastener having an essentially planar portion, an L-shaped member connecting to the essentially planar portion, and a pair of rivets inserting through the essentially planar portion to connect the fastener to the elongated flexible member,
wherein the essentially planar portion and the L-shaped member for each fastener form a slot for receiving one of the tabs extending from the module, so that the pair of tabs holds the module in place when inserted therein.

2. The food transportation apparatus of claim 1, further comprising a plurality of modules and a plurality of fasteners to connect the plurality of modules to the elongated flexible member.

3. The food transportation apparatus of claim 2, wherein each of the plurality of modules is identical and each of the plurality of fasteners is identical.

4. The food transportation apparatus of claim 2, wherein the elongated flexible member can be bent into a hands-free harness configuration with the pair of end portions aligned in a parallel, spaced apart relationship and the center portion defining a collar to be worn around the neck of a user to facilitate the carrying of the food transportation apparatus.

5. The food transportation apparatus of claim 2, wherein the elongated flexible member is made from a preselected material that has sufficient tensile strength to support the plurality of modules when the plurality of modules are fully loaded.

6. The food transportation apparatus of claim 1, wherein each of the plurality of lids include a flange.

7. The food transportation apparatus of claim 1, wherein the elongated flexible member is a strap.

8. The food transportation apparatus of claim 7, wherein the strap is plastic.

9. The food transportation apparatus of claim 1, wherein the module is a carton.

10. The food transportation apparatus of claim 9, wherein the module is made from paperboard.

11. The food transportation apparatus of claim 1, wherein rivet is a blind rivet.

12. The food transportation apparatus of claim 11, wherein each blind rivet includes a rivet body and a mandrel.

13. The food transportation apparatus of claim 1, wherein the at least one receptacle includes a plurality of walls, a bottom, and a recloseable lid.

* * * * *